United States Patent
Petring et al.

(10) Patent No.: US 6,365,870 B1
(45) Date of Patent: Apr. 2, 2002

(54) METHOD AND DEVICE FOR TREATING WORK PIECES WITH LASER RADIATION

(75) Inventors: Dirk Petring, Kerkrade (NL); Hans-Georg Treusch, Aachen (DE); Reinhart Poprawe, Aachen (DE); Peter Loosen, Aachen (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/529,468
(22) PCT Filed: Oct. 16, 1998
(86) PCT No.: PCT/DE98/03020
§ 371 Date: Apr. 7, 2000
§ 102(e) Date: Apr. 7, 2000
(87) PCT Pub. No.: WO99/20428
PCT Pub. Date: Apr. 29, 1999

(30) Foreign Application Priority Data

Oct. 22, 1997 (DE) .......................... 197 46 697
Dec. 19, 1997 (DE) .......................... 197 56 703

(51) Int. Cl.⁷ .............................. B23K 26/38
(52) U.S. Cl. ...................... 219/121.67; 219/121.72
(58) Field of Search ................ 219/121.63, 121.64, 219/121.67, 121.72, 121.73

(56) References Cited

U.S. PATENT DOCUMENTS

| | | | | |
|---|---|---|---|---|
| 4,537,809 A | * | 8/1985 | Ang et al. ................. | 428/42.2 |
| 4,943,700 A | * | 7/1990 | Hughes et al. ......... | 219/121.67 |
| 5,120,926 A | * | 6/1992 | Marriott ................ | 219/121.67 |

* cited by examiner

Primary Examiner—Samuel M. Heinrich
(74) Attorney, Agent, or Firm—Pandiscio & Pandiscio

(57) ABSTRACT

A method for processing moving workpieces with laser radiation that is focused on a to-be-processed workpiece surface by means of a laser beam that is moved but not relative to the workpiece. The laser beam is focused in a line-like manner and its beam spot corresponds practically exclusively and with full a real coverage to the work piece surface to be processed.

25 Claims, 1 Drawing Sheet

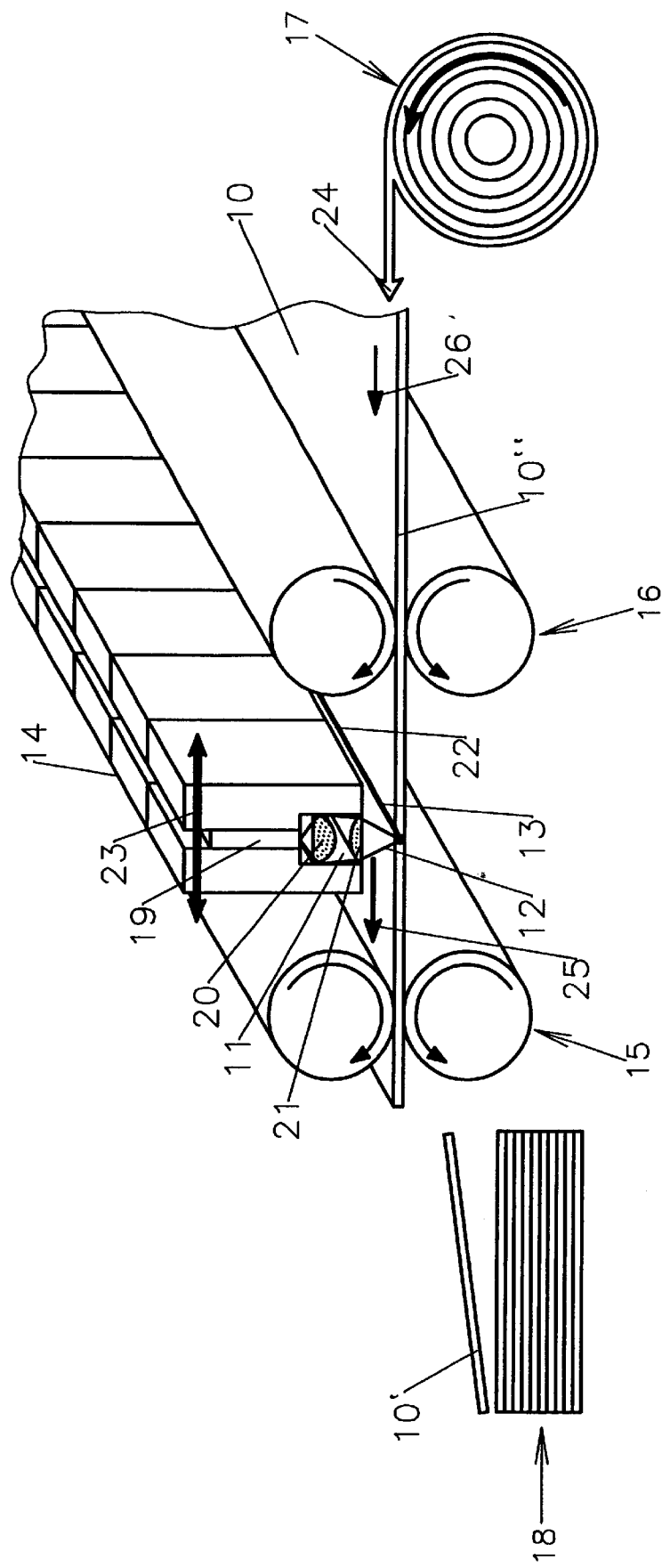

METHOD AND DEVICE FOR TREATING WORK PIECES WITH LASER RADIATION

The invention relates to a method for processing[1] workpieces with laser radiation that is focused on a to-be-processed workpiece surface by means of a laser beam that is not moved relative to the workpiece.

[1]TRANSLATOR'S NOTE: The German word "Bearbeitung" can be translated variously as processing, machining, treating or working. We have chosen "processing" over "machining" because it is more generic, and have rejected "treating" as implying some change in the properties of the material and "working" as implying deformation of it.

The aforesaid method is known from DE-A 33 44 709. Workpieces are deburred by this method. The laser beam is stationary. Its focal diameter is selected as so large that the entire area for deburring is covered. However, most of the beam energy fails to be used for burr removal because it falls on areas that are not intended for deburring or on areas where no workpiece is present, e.g. on holes in the workpiece. A large proportion of the energy of the laser radiation is therefore unused, and depending on the conformation of the workpiece, special measures may even be needed to ensure that the unused laser radiation is not harmful to the surroundings in areas of the workpiece not intended for deburring or areas adjacent the workpiece.

The task of the invention, by contrast, is to improve a method comprising the foregoing steps in such a way that a laser beam that is stationary relative to the workpiece can be used to process a workpiece surface diverging from the punctiform without wasting any of the available energy of the laser beam.

The aforesaid task is accomplished in that the laser beam is focused in a line-like manner and its beam spot corresponds practically exclusively and with full areal coverage to the workpiece surface to be processed.

It is essential to the invention that the beam spot of the laser beam be focused in a line-like manner in such a way that the workpiece surface for processing is irradiated as exactly as possible, specifically over its entire area. Consequently, the entire workpiece surface for processing is also simultaneously heated, and the heating simultaneously causes desirable processes to occur in the workpiece, e.g., melting of a parting line or a joint. Workpieces can also be processed over a larger area, however, provided that the laser beam functions in a line-like manner over the entire area, for example in the case of material transformations on hardened laser tracks.

The approach can be such that a focused line that is uniformly narrow over its entire length is used. Such uniformly narrow lines lend themselves especially well to joining and severing processes suitable for use in mass production. The narrow, focused line can be realized in such a way that high energy densities of the kind needed for joining or severing can be attained with the available laser sources. For example, metal foil or strips of thin or ultra-thin metal plate can be severed transversely. Such narrowly focused lines are also advantageous when there are problems in machining the material due to wear of the tool and/or impermissible mechanical stress on the strip material. Such severing processes are advantageously carried out such that the entire width of a plate or a traveling strip is severed in a pulsed manner by means of linear laser radiation.

A large number of processing operations on shapes and webs can be performed with the method described above. It is advantageous if the approach is such that the line extends over the entire width of the workpiece and/or forms a contour with an unirradiated center and/or follows an arbitrarily predetermined course and/or exhibits a nonuniform width over its course. Lines extending over the entire width of the workpiece are advantageous in particular in the severing or joining of workpieces. If a line forms a contour with an unirradiated center, recesses corresponding to the contour can be made in the workpiece. In such cases the shape of the line is of no consequence, as a rule. The line can follow any arbitrarily predetermined course, for example it can have curves. The nonuniform width of the line over its course can be advantageous when an influence is to be exerted on the shape of a parting line, joint line or recess.

If the output of the available laser sources is limited, it can be advantageous to perform the method in such a way that the line used is made up of component lengths that cover the entire length of the line simultaneously or in cycles consecutively. In this case the approach is to use laser radiation preferably emanating from a plurality of laser sources and consisting of an uninterrupted sequence of individual beams or groups thereof that simultaneously cover the entire line length or a component length. A plurality of laser sources can thus be used to irradiate the entire length of the line simultaneously. A single laser is sufficient if the line as a whole is to be worked through consecutively in cycles.

It is especially advantageous if the laser radiation is generated by means of diode laser bars and/or diode laser stacks. Diode laser bars and stacks each employ a plurality of laser diodes. Their laser radiation can be aligned and focused in linear form by suitable arrangement of the bars or stacks. They are especially well suited for focusing the laser beam—which then consists of a plurality of component beams from the individual laser diodes—in a line-like manner and allowing it to irradiate the entire area of the workpiece surface being processed.

The method can be performed in such a way that the laser radiation is used for severing. A processing operation similar to shearing takes place, since the workpiece is irradiated in a pulse-like manner and is disunited into its severed pieces. This is a contactless cutting operation that does not have the considerable disadvantages of mechanical severing methods performed with cutters. In particular, mechanical deformation of the workpiece is avoided.

For practical use, the above-described method is especially advantageous if a laser radiation source and/or at least one processing head delivering a laser beam are comoved with and at the same speed as a moving workpiece as the workpiece is being irradiated. The comovement of the laser radiation source with a moving workpiece makes it possible to use the method in particular for the transverse severing of sheet or strip material. The most frequently used method at present for the transverse severing of strip material consists in the use of mechanical means, so-called "flying shearing" or "eccentric shearing." In this method, a cutter or a guillotine shear disposed transversely to the strip is comoved with the traveling strip for a short distance. The simultaneous process of raising the cutter and comoving it with the strip must be performed in such a way that the cutter travels exactly along with the strip while it is embedded in the strip material and then turns back oppositely to the direction of strip motion. The drives required for this arrangement, for example eccentric drives, must reach the highest possible cycle rates. This is limited by mechanical factors, however, particularly when the cutter or drive masses have a relatively high weight and the accelerative and decelerative forces are correspondingly high. In particular, this means that the eccentric needs a start-up and a run-down time, as well as a very high-cost, stable machine frame because of the high forces generated. The cutting process induces mechanical stresses in the workpiece material and can lead to burring and strain hardening in the region of the cut edge. The above-described severing methods do not have the disadvantages of the known mechanical severing arrangements. Particularly with the use of diode laser bars or diode laser stacks, the mass that must be moved is comparatively slight. Their rate of travel or that of the laser cutting heads can therefore be significantly higher than the speed of the strip. High cycle rates and short segments of strip between two processing operations can be obtained if the workpiece is processed while in motion. The overall lengths of the parts being moved are relatively small in the direction of feed, and the amount of floor space required for the cutting frame is also, therefore, relatively small.

The method is advantageously performed in such a way that as the workpiece is being irradiated, mechanical or magnetic means are used to sever it into severed pieces. The use of mechanical or magnetic means creates a melt-free interspace between the severed parts. It is then unnecessary to continue to irradiate the workpiece surface being processed in order to keep the melted material from hardening prematurely before the parts that are to be severed are severed from one another. With magnetic means, for example a magnetic field acting on the melt, the operation can be carried out by a contactless mechanical method. The mechanical means is appropriately selected.

It is advantageous, for example, if the mechanical means comprises gas nozzles that eject melt from the melted region of the workpiece. With gas nozzles it is possible to use gas jets whose pressure effect ejects the melt.

However, the method can also be performed in such a way that the mechanical means is a source of parting force that removes the severed pieces of the workpiece from one another. In the most general case, these are gripping devices that lay hold of the severed pieces and pull them apart.

If a continuous processing operation is to be performed, the approach can be such that the workpiece is advanced by means of spaced-apart conveying means between which the laserradiation processing takes place and which serve as sources of parting force. The conveying means ensures the continuous advancement of the workpiece and simultaneously eliminates the need for any separate mechanical severing means.

The above-described method can be accomplished in an especially simple manner if the conveying means used is a pair of driving rollers with differently controlled conveying speeds for severing the parts that are to be severed. Driving-roller pairs are proven means of conveyance in materials-handling technology, and they can be driven at different conveying speeds with comparatively little expenditure, thus severing the pieces of the workpiece that are to be severed.

Some of the method steps described hereinabove can also be used for other processing operations in which high-energy radiation is employed. Hardening and soldering are examples of is such processes. Above all, however, it is advantageous if the line-like laser radiation is used for linear joining. Linear joining is particularly advantageous in mass production processes, where it can improve spot welding by making it possible for larger linear or areal regions to be connected with the same expenditure of time, thereby substantially increasing the strength of the connection.

The method can be used on workpieces made of the widest variety of materials and of different materials. However, it is advantageous if a workpiece made of thin metal plate, foil or molded plastic parts is used. Thin metal plate can be subjected to linear processing even at relatively low radiation intensities, as can metal foil, plastic foil or molded plastic parts.

The invention relates to a method for processing workpieces with laser radiation that is focused on a to-be-processed workpiece surface by means of a laser beam that is not moved relative to the workpiece.

With such a device, the disadvantages described in the preamble to the specification can be avoided and the stated advantages achieved if the laser beam is focused linearly and its beam spot corresponds practically exclusively and with full areal coverage to the workpiece surface to be processed.

A device that is characterized in that the laser beam covers with a line-like beam spot the entire length of a predetermined parting line on the workpiece, and in that the severing means for severing the to-be-severed pieces of the workpiece is present during this irradiation, is particularly well suited for dividing workpieces or for shaping them by cutting out or cutting off portions thereof.

To bring it about that the workpiece is not moved in relation to the laser beam, the device is realized so that it comprises a controlled drive that is able to adjust, in accordance with any movements and/or positionings of the workpiece, a laser source that serves to generate the laser beam and/or a device delivering the laser beam. Movements of the workpiece relative to the laser beam or a plurality of laser beams can be compensated by means of such a device. The control of the movement of the laser beam is effected in coordination with the movement of the workpiece. There is no relative motion between the laser beam and the workpiece. By means of the controlled drive, however, it is possible to offset different positionings of a workpiece or of workpieces that are to be processed consecutively in that the drive is controlled in accordance with the different positionings of a workpiece or a plurality of workpieces. The control of the drive is influenced, for example, by a position-detecting system, e.g., by position-monitoring video cameras.

For processing on a conveyor belt, i.e., for continuous processing, the above-described device can be realized in such a way that the workpiece is conveyed by rollers and a controller is present for tensioning or severing the workpiece. The controller can influence the severing means or the conveying means serving for roller conveyance.

In an improvement of the device, it is provided that diode laser beam tools are present for generating the laser radiation. Said diode laser beam tools can be, for example, diode laser bars or diode laser stacks, which by their very mechanical arrangement are especially well suited for generating laser radiation that is focused in a line-like manner.

The device can be used as an optical eccentric shear if an eccentric drive is present to bring about comovement of a beam tool with the workpiece, at an equally fast speed, as the workpiece is being irradiated. With such an eccentric drive, a source of laser radiation generating the line-like laser beam is comoved with the workpiece, as in the case of conventional mechanical eccentric shears, by the eccentric drive during the irradiation process, by means of a belt, for example. During this short time there is no relative motion between the workpiece and the tool, as the cutting process takes place on the conveyor belt. The laser radiation source is then guided back oppositely to the travel of the belt to then initiate a further cutting process, taking the nominal segment length into account. In contrast to the case with mechanical eccentric shears, elevation vertical to the surface of the workpiece is not necessary, although it is permitted when the cutting pulse is not present. The radiation source could thus be moved in a linear guide or across the workpiece in or against the direction of travel thereof, and can be driven, for example, by one or more rotary motors via one or more connecting rods.

Beam tools have a comparatively low mass, so that high relative reverse speeds can be attained, as well as short start-up and run-down times for the device.

The device can be realized in such a way that two line-like laser beams are present and are directed at workpiece surfaces disposed one on top of the other in the same processing zone or disposed in consecutive processing zones. The workpiece thus can be processed more quickly since it is being irradiated from both sides at the same time, the melting process progressing correspondingly more rapidly if the two laser beams are directed at the same processing zone. If the laser beams are directed at consecutive processing zones, a corresponding increase in the processing rate or an increase in cycle rate can be achieved, especially in the case of moving laser-beam tools. The direction of irradiation can be preserved in each case. When a processing zone is processed with two laser beams, particularly in combination with an eccentric drive to comove the beam tool with the work, the two beam tools that are then necessary are able to cooperate to offset imbalances. The stresses on the machine frame are lower and the device is smooth-running.

When two laser beams are present, the device is advantageously realized so that the two laser beams are arranged at an angle to each other. The angle need only be large enough so that neither laser beam enters the output device of the other and causes undesirable heating or destruction there.

The device can be implemented to include adjusting means for the course and/or shape and/or focus of the line and/or the intensity variation of the laser radiation over the length of the line. With this adjusting means, the device can be implemented to achieve high flexibility of application. The adjusting means for the course of the line can be used to set curves or angles, for example. A line shape adjusting means makes it possible, for example, for very narrow line segments to be exchanged for slightly less narrow ones. Line focus adjusting means permit adaptations to the surface and/or thickness of the workpiece. Adjusting means for the intensity variation of the laser radiation permit different welding depths, for example.

The invention is explained in more detail with reference to an exemplary embodiment depicted in the drawing.

The sole figure is a schematic perspective view of a so-called optical eccentric shear for the transverse dividing of conveyed strips of metal plate.

The device shown in the figure for the transverse dividing of strip 10 unwinds said strip from a coiled stock 17 of strip by means of a driving-roller pair 16. Said strip 10 passes from driving-roller pair 16 to driving-roller pair 15, and between the two driving-roller pairs 15, 16 it is divided. The severed piece 10' divided from continuous strip 10 is placed on a stack 18 of severed pieces. The strip is preferably ultra-fine metal plate; the additional guide means that may be required for this material have been omitted for the sake of clarity.

Strip 10 is divided or the to-be-severed pieces 10' are severed by a source of laser radiation in the form of a diode laser beam tool realized as diode laser bars 14. The radiation delivered by the schematically depicted laser diodes 19 passes into an optical collimator 20, which supplies laser radiation 11 to a focusing optics 21. The latter focuses a laser beam 12 with a beam spot 13 onto the to-be-processed workpiece surface of strip 10. The laser beam 12 is a narrow line that corresponds to a desired melt line 22. Beam spot 13 accordingly covers melt line 22 over its entire area. Melt line 22 extends from the front edge 10" in the figure to the back edge, not shown in the figure. Strip 10 is accordingly melted over its full width on melt line 22. This melting is used to sever the segment of strip 10 that is in front in the conveying device, creating a severed piece 10' that is conveyed by the front driving-roller pair 15 to the depicted stack 18 of severed pieces.

The double arrow 23 indicates that the diode laser bars 14 or the diode-laser beam tool must be moved in the feed direction 24 of strip 10 and in the opposite direction. This is necessary so that the beam spot remains on the strip long enough to melt the strip material, and to do so solely in the region of melt line 22. The cutting pulse and the laser radiation acting on the strip for a predetermined time must not change their relative positions. The movement of diode laser bar 14 between driving-roller pair 16 and driving-roller pair 15 therefore takes place as rapidly as the movement of the strip 10. After the predetermined duration of action of the laser beam on the workpiece, diode laser bar 14 can be moved backward, in the region between driving-roller pairs 15 and 16, against the feed direction 24 of strip 10. Bar 14 is brought as close to driving-roller pair 16 as is possible and necessary, the backward conveying speed being adjusted to the predetermined length of severed piece 10' as a function of the conveying speed 24. To obtain especially short lengths, the backward conveying speed can be very high compared to the backward conveying speeds of conventional mechanical eccentric shears.

The severing of severed piece 10' from strip 10 is aided by driving-roller pair 15. This conveys severed piece 10' at a higher conveying speed than driving-roller pair 16. The difference in the conveying speeds is visualized by the difference in size of the conveying-speed arrows 25, 26. Driving-roller pair 15 thus is not merely a means of conveyance of the workpiece, but also a source of parting force, which further ensures that severing piece 10' is removed along the melt line of strip 10 after the material has melted, since the melted material no longer ensures mechanical cohesion. The period of irradiation of the melt line can thus be kept shorter. There is no need to wait until local heating and melting and/or evaporation of the material on the narrow cutting line has resulted in the effective severing of severed piece 10 from the strip.

Driving-roller pair 15 applies tension to the strip, causing it merely to be pulled apart at the weakened melt line. The melt can serve to round off the cut edge. The duration of action of the laser beam can be reduced to a minimum.

The above-described embodiment lends itself, for example, to the cutting or severing of ultra-fine metal plate less than 0.2 mm thick. Cycle rates of 1 to 10 Hz can be achieved in such cases with the use of diode laser bars 14 with an eccentric drive. The width of the melt line or the beam spot 13 approximately corresponds to the wall thickness, and the necessary beam output is 1 to 10 kW/m, depending on the strip material and the conveying speed.

A straight melt line 22 is shown in the figure. However, any desired curved, open or closed cutting contour can be irradiated. In this manner, punching operations can be performed without contact and almost without the application of force, thereby practically eliminating the disadvantages of mechanical effects. In the case of this known mechanical method, because of the weight of the mechanical cutter and the associated kinematic limits, the cutting cycle rate is too low for many desirable production processes. Also eliminated are the disadvantages of known severing methods employing a moving laser beam in which the laser beam is moved along the cutting contour. Here again, the necessary cycle rates cannot be attained.

What is claimed is:

1. A method for processing workpieces with laser radiation, the method comprising the steps of:
focusing a laser beam in a line-like manner on a portion of a surface of a workpiece such that a beam spot projected by the laser beam covers fully the surface portion of the workpiece and is confined thereto;
moving the workpiece; and
moving the laser spot simultaneously with the workpiece, such that there is no relative movement between the beam spot and the workpiece surface portion.

2. The method according to claim 1, wherein the focused line is uniformly narrow over its entire length.

3. The method according to claim 1, wherein the beam spot extends over the entire width of the surface portion and the beam forms a selected one of (i) a contour with an unirradiated center, (ii) an arbitrarily predetermined course, and (iii) a line width that is nonuniform over the course of the line.

4. The method according to claim 1, wherein the focused line is made up of component lengths that cover the entire line length a selected one of (i) simultaneously and (ii) in cycles consecutively.

5. The method according to claim 1, wherein the laser radiation comprises a selected one of (i) an uninterrupted sequence of individual beams, and (ii) groups thereof that simultaneously cover a selected one of (i) the entire line length, and (ii) a component length.

6. The method according to claim 1, wherein the laser radiation is generated by means of a selected one of (i) diode laser bars and (ii) diode laser stacks.

7. The method according to claim 1, wherein the laser radiation is used for severing.

8. The method according to claim 7, wherein the full width of a workpiece is severed in a pulse-like manner by means of the linear laser radiation.

9. The method according to claim 7, wherein a source of laser radiation delivering the laser radiation is comoved with and at the same speed as a moved workpiece as it is being irradiated.

10. The method according to claim 7, wherein a selected one of a (i) mechanical, or (ii) magnetic means is used to sever the to-be-severed pieces during the irradiation of the workpiece.

11. The method according to claim 10, wherein gas nozzles are used to expel melt from a melted region of the workpiece.

12. The method according to claim 10, wherein the mechanical means comprises a source of parting force that removes the severed pieces of the workpiece from one another.

13. The method according to claim 12, wherein the workpiece is conveyed by spaced-apart conveying means between which the laser-radiation processing takes place and which serve as sources of the parting force.

14. The method according to claim 13, wherein the conveying means comprise driving-roller pairs having differently controlled conveying speeds for severing the pieces to be severed.

15. The method according to claim 1, wherein the line-like laser radiation is used for line joining.

16. The method according to claim 1, wherein the workpiece comprises a selected one of (i) a thin plate, (ii) a foil and (iii) a molded plastic part.

17. A device for processing surface portions of moving workpieces with laser radiation that is focused on a to-be-processed workpiece surface portion by means of a moving laser beam that is not moved relative to the workpiece, wherein the laser beam is focused in a line-like manner and its beam spot corresponds exclusively and with full area coverage to the workpiece surface portion to be processed.

18. The device according to claim 17, wherein the device comprises a controlled drive that is adapted to adjust, in accordance with any movements of the workpiece, a laser source serving to generate the laser beam, and a device for delivering the laser beam.

19. The device according to claim 17, wherein the laser beam covers with a line-like beam spot the entire length of a predetermined parting line on the workpiece, and the device comprises severing means for severing a to-be-severed piece of the workpiece during the irradiation thereof.

20. The device according to claim 17, wherein the workpiece is conveyed by driving rollers and a controller is present for tensioning and severing the workpiece.

21. The device according to claim 17, wherein the device comprises a diode laser beam generator for generating the laser radiation.

22. The device according to claim 17, wherein the device further comprises an eccentric drive to effect comovement of the laser beam with, and at the same speed as, the workpeice during irradiation.

23. The device according to claim 17, wherein two line-like laser beams are present and are directed at workpeice surfaces disposed one on top of the other in a selected one of (i) a same processing zone, and (ii) consecutive processing zones.

24. The device according to claim 23, wherein the two laser beams are disposed at angles to each other.

25. The device according to claim 17, and further comprising adjusting means for a selected one of (i) the course, and (iii) focus on the line, and (iv) the intensity variations of the laser radiation over the length of the line.

* * * * *